United States Patent [19]

Yamamichi

[11] 4,313,661
[45] Feb. 2, 1982

[54] ELECTROMAGNETIC RELEASE DEVICE FOR CAMERA

[75] Inventor: Masayoshi Yamamichi, Kawasaki, Japan

[73] Assignee: Canon Kabushiki Kaisha, Tokyo, Japan

[21] Appl. No.: 122,843

[22] Filed: Feb. 20, 1980

[30] Foreign Application Priority Data

Feb. 21, 1979 [JP] Japan .................................. 54-19226

[51] Int. Cl.³ ........................ G03B 9/08; G03B 17/38
[52] U.S. Cl. .................................... 354/235; 354/266
[58] Field of Search ........................ 354/234, 235, 266

[56] References Cited

U.S. PATENT DOCUMENTS 4,132,474  1/1979  Ueda et al. .......................... 354/234
4,133,608  1/1979  Tanaka ................................ 354/234
4,160,983  7/1979  Inagaki et al. ..................... 354/234

Primary Examiner—Russell E. Adams
Attorney, Agent, or Firm—Toren, McGeady & Stanger

[57] ABSTRACT

An electromagnetic shutter release device is described. The device includes an attracting spring coupled to the release operation initiating member to hold the armature. And at once when the biasing force of the retracting spring is lost in the course of the shutter releasing action, the armature is reset on the core quickly.

8 Claims, 4 Drawing Figures

FIG.1
FIG.2
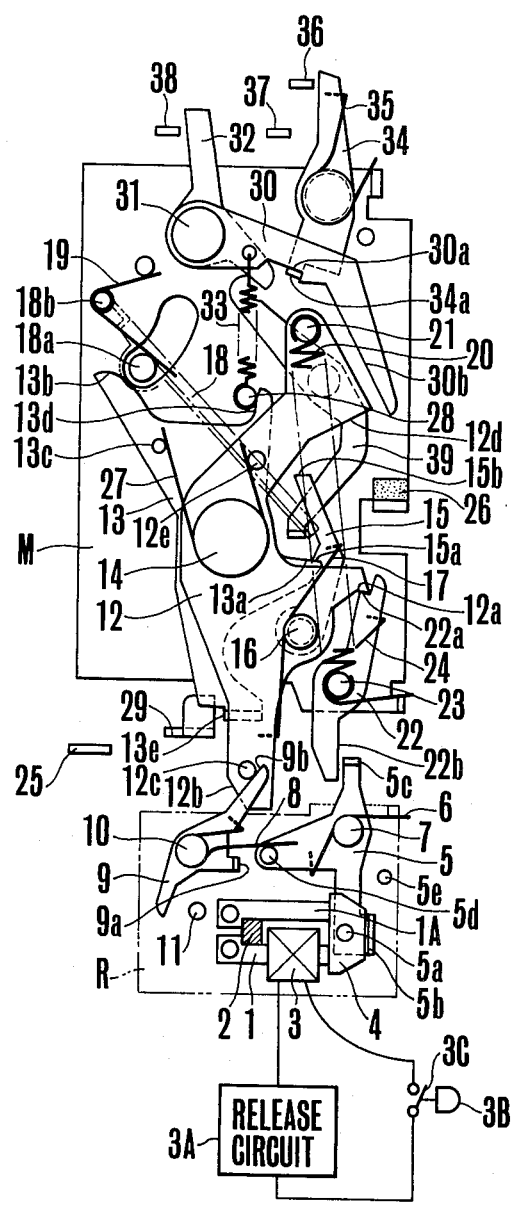
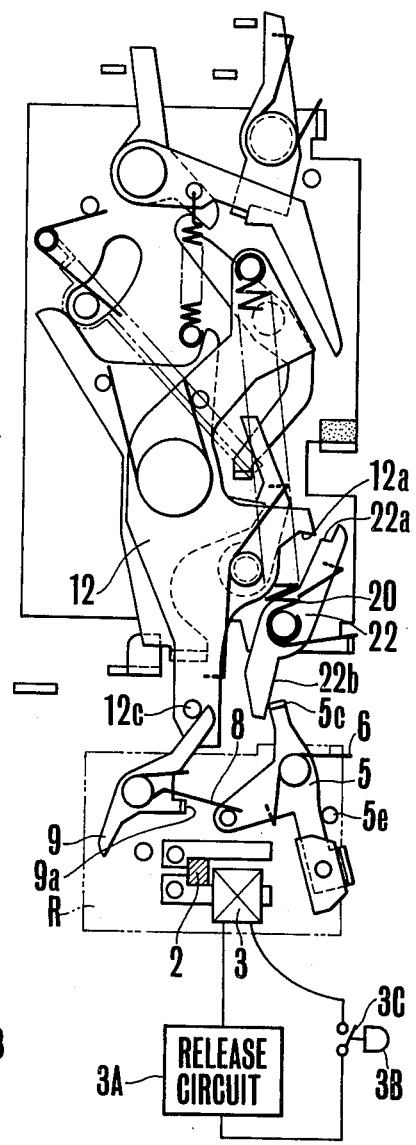

ELECTROMAGNETIC RELEASE DEVICE FOR CAMERA

BACKGROUND OF THE INVENTION

1. Field of the Invention

The present invention relates to an electromagnetic release device, and particularly to device employing a combination magnet including a magnet core, a permanent magnet and an electromagnet coil in operatively associated relation.

2. Description of the Prior Art

In an electromagnetic shutter release device of the type in which the shutter is released as an armature is retracted or moved away from a magnetic core by a shutter releasing operation, the armature is spring biased toward quick disengagement from the core in order to ensure that the releasing action will immediately occur with the shutter releasing operation. Since the armature will accordingly remain disengaged from the core after each shutter release, it is necessary to reset the armature into engagement with the core. This reset action has been accomplished either with a member of a camera mechanism in association with a subsequent shutter charging or cocking operation or otherwise in association with an exposure terminating operation.

However, in the former case mentioned above, the core remains apart from the armature for the while until the sequent shutter charging operation is performed so that there are dangers such that dust or foreign matters get between these members, and that these members are damaged.

In order to prevent these dangers, it may be considered that these members are sealed by means of a case and the like, but such measures will inevitably complicate the structure, and failing to meet with practical purposes.

Meanwhile, in the latter case mentioned above, although generally less dangerous than the former case, but similar dangers are still likely to be caused in the case of recently developed cameras with an electronic shutter in which a very long exposure time is often set.

For the purpose of overcoming the above disadvantages of conventional devices, a device which accomplishes the reset action in relation with the shutter releasing action has been proposed in U.S. Pat. No. 4,133,608.

In the case of the device disclosed in this U.S. Patent, the armature 6 is reset by engaging with the core 4a by engaging the bent portion 11b of the release sensor 11 with the resetting projection 9b, and the shutter opening is initiated by the engagement of the raised portion 11a provided at the other end of the sensor 11 with the lock lever 12. Therefore, this prior art device still is confronted with disadvantages that the armature cannot be reset only simultaneously with or after the initiation of the opening operation of the shutter, so that the above mentioned reset action is retarded.

That is, in the device of U.S. Pat. No. 4,133,608, when the armature 6 is reset on the core 4a by the rightward movement of the sensor 11, the bent portion 11b of the sensor 11 is locked on the resetting projection 9b, and thus is prohibited to make a further rightward movement so that it is impossible to release the engagement of the lock lever 12 after the armature 6 is reset on the core 4a.

Therefore, in the device according to U.S. Pat. No. 4,133,608, it is impossible to perform the reset action before the initiation of the shutter opening operation, so that this prior art device still has some possibility of danger that the reset action is retarded and dust or foreign matters come into between the members and damage the members as mentioned hereinbefore.

Further, due to the structure as mentioned before, the device of the U.S. Patent has a problem that the armature 6 in some cases fails to engage with the core 4a or in other cases severely strikes the core 4a depending on the accuracy of the resetting projection 9b. Therefore, in this prior art, it is necessary to precisely work the resetting projection 9b.

SUMMARY OF THE INVENTION

One of the objects of the present invention is to provide an electromagnetic release device which performs the reset action before the shutter opening operation.

Another object of the present invention is to provide an electromagnetic release device which can peform the reset action with a weak force.

Further object of the present invention is to provide an electromagnetic release device which does not require a high degree of design and manufacturing accuracy.

BRIEF DESCRIPTION OF THE DRAWINGS

FIG. 1 is a plane view showing one structural embodiment in a wind-up completion state of a single lens reflex camera with an electromagnetic release device according to the present invention.

FIG. 2 is a plane view showing the device of FIG. 1 in an initial state of release starting.

DESCRIPTION OF THE PREFERRED EMBODIMENTS

Figure 3:
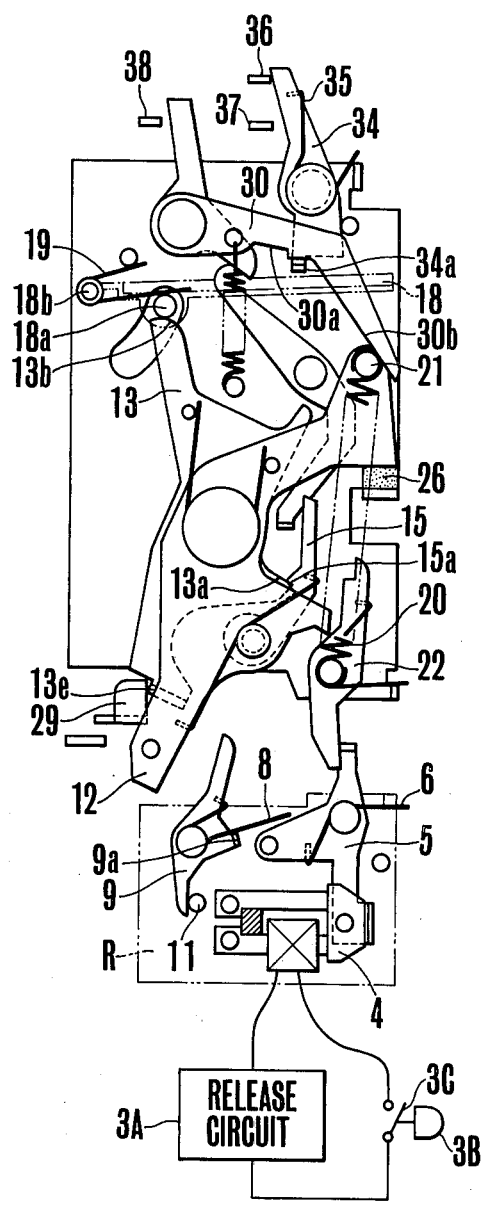
FIG. 3 is a plane view showing the device of FIG. 1 at the stage of mirror-raising.

In FIG. 1, R represents an electromagnetic release unit, 1 and 1A are respectively a yoke functioning as a magnetic core having a permanent magnet 2 held therebetween. 3 is a coil around the yoke 1, and 4 is an armature which is attached by a pivot 5a to an armature holding lever. 5b is a stopper for preventing the swinging of the armature. 6 is an attracting spring, one end of which is held by the armature-holding lever 5 for automatically resetting the armature to the yokes 1 and 1A, 7 is a pin fixed to the electromagnetic unit for supporting the armature holding lever 5. 5c is a raising portion of the lever 5 for releasing a mirror lifting unit M, 5d is a pin planted to the lever 5 for receiving the biasing force of a departing spring 8, 9 is a lever supported by a pin 10 for charging the spring 8, 11 is a stopper for the charge lever 9, 9a is a projection for exerting pretension to the departing spring 8, 9b is an arm which is charged in association with the mirror lifting unit M. The attracting spring 6 is designed to have a far less force than the departing spring because it is satisfactory for the spring 6 to have only a spring force enough to attract the yokes 1 and 1A. The mirror lifting mechanism M has an energy storing lever 12 and a jumping lever 13 pivoted by a pin 14.

15 is an engaging claw having a pin 16 around which the energy storing lever 12 is rotatably supported. 17 is a spring engaged with the claw 15. The claw 5 has a hook portion 15a which engages with the end portion 13a of the jumping lever 13. The other end 13b of the lever 13 constitutes a cam portion for jumping up a pin 18a planted to a mirror receiving plate unit 18 hinged by a pin 18b to the mirror lifting unit M. 19 is a return spring for returning the mirror receiving plate unit 18. 20 is a driving spring for providing the driving energy for the mirror lifting operation, one end of which is mounted on a joggle pin 21 functioning as a spring mount and hook takeoff planted to the energy storing lever 12 and the other end of which is mounted on a pin 23 of a start lever 22 for the mirror lifting unit M. 24 is a spring engaged with the start lever 22. The start lever 22 has a hook portion 22a at its upper end, which engages with the hook portion 12a of the lever 12, and the other end 22b of the lever 22 is linked with the raising portion 5c of the armature holding lever 5 of the electromagnetic release unit R.

The lower end portion 12b of the energy storing lever 12 constitutes a cam portion which is charged by a charge connecting lever 25 which reciprocates in association with a winding-up mechanism (not shown), and this lower end portion 12b has a pin 12c planted thereon.

12d of the lever 12 represents a contact surface to which a stopper 26 contacts. The stopper 26 is made of elastic material for preventing sound and shock, and is fixed to the mirror lifting unit. 27 is a return spring mounted between a pin 12e planted on the energy storing lever 12 and a pin 13c planted on the jumping lever 13 and functions to return the jumping lever 13 to the position of a stopper pin 28 by means of the portion 13d. The bent portion 13e at the lower end of the jumping lever 13 is linked with an automatic diaphragm lever 29 associated with an automatic diaphragm device (not shown).

30 is a hooked claw for releasably locking the shutter and is supported by a pin 31, 32 is a rear screen signal lever also supported by the pin 31.

Although the rear screen signal lever 32 and the hooked claw 30 are coaxially supported by the pin 31, they are designed so as not to link with each other. 33 is a spring for the hooked claw 30. 34 is a lever for releasably locking the shutter front screen, which is forced by a spring 35 to release a front screen engaging lever 36 for the shutter front screen (not shown). 37 is a charge lever for the front screen which reciprocates through a wind-up association system to charge the lever 34 against the spring 35 so as to engage the hooked portion 30a with the rising portion 34a.

The slanted portion 30b of the hook claw 30 is designed to contact with the joggle pin 21 of the energy storing lever 12. The rear screen signal lever 32 is brought into contact with the upper end portion 15b of the engaging claw 15 through an intermediate lever 39 by a rear screen signal member 38 which operates in association with the shutter rear screen (not shown).

Descriptions will be made on the operation of the device for shifting from the state of FIG. 1 to the state of FIG. 2. In FIG. 2, the same numerical references are used for the same members in FIG. 1.

When the switch 3C is closed in association with the shutter button 3B and a pulse is are applied to the coil 3 from the circuit 3A, a magnetic force in a contrary direction to the magnetic force of the permanent magnet 2 is generated from the coil 3, and the retracting spring 8 urges the armature holding lever 5 in the counterclockwise direction against the biasing force of the attracting spring 6, so that the rising portion 5c pushes forward the portion 22b of the start lever 22 to rotate the start lever 22 in the clockwise direction. At this time, the engagement between the upper end hooked portion 22a of the start lever 22 with the hooked portion 12a of the energy storing lever 12 is released. Under this condition, the lever 12 is rotated in the clockwise direction by the driving spring 20, but the armature holding lever 5 is prevented from rotating by the stopper 5e so that the retracting spring 8 mounted on the charge lever 9 departs from the projection 9a and the spring 8 generates a force to rotate the charge lever 9 in the counterclockwise direction. Along with the clockwise rotation of the energy storing lever 12, the retracting spring charge lever 9 rotates in the counterclockwise direction in contact with the pin 12c. With the above operation, the device gets into the initial state for release starting.

Referring to FIG. 3, the energy storing lever 12 is further rotated from the state shown in FIG. 2 by the driving spring 20, the mirror receiving plate unit 18 is jumped up in the upward moving process. Along with the clockwise rotation of the energy storing lever 12, the charge lever 9 rotates in the counterclockwise direction, but it strikes the stopper 11 in the course of the rotation and is stopped thereby.

Under this stopped state, the retracting spring 8 contacts the projection 9a to loses its force so that the armature holding lever 5 is suddenly rotated in the clockwise direction by the attracting spring 6, and the yokes 1 and 1A and the armature 4 are brought again into the attracted state. Thus the hooked portion of the start lever 22 is released with the starting signal of the electromagnetic release unit R, and in the course of the clockwise rotation of the energy storing lever 12, the armature holding lever 5 is again brought to the attracted state.

At this point, as the hooked portion 13a of the jumping lever 13 is still engaged with the hooked portion 15a of the claw 15, the lever 13 accompanies the rotation of the lever 12 to rotate in the clockwise direction all together with the energy storing lever 12 and the cam portion 13b of the lever 13 rotates the pin 18a of the mirror receiving plate unit 18 around the hinge shaft 18b in the counterclockwise direction against the retraction spring 19 to jump up the pin 18a to the mirror up state. Similarly, the automatic diaphragm lever 29 linked with an automatic diaphragm (not shown) is also moved by the bent portion 13e to stop down a diaphragm blade (not shown). Simultaneously, the pin 21 for releasing the energy storing lever 12 contacts the slanted portion 30b of the claw 30 to rotate it in the counter-clockwise direction, so that the engagement between the hooked portion 30a and the projection 34a of the lever 34 is released and the lever 34 is rotated by the spring 35 in the counterclockwise direction to release the front screen engaging lever 36 to cause the front screen of a shutter mechanism (not shown) to run. After that the energy storing lever 12 still rotates in the clockwise direction until it contacts the stopper 26 and is stopped thereby.

With the above operation, the device gets into the mirror-up state shown in FIG. 3.

Figure 4:
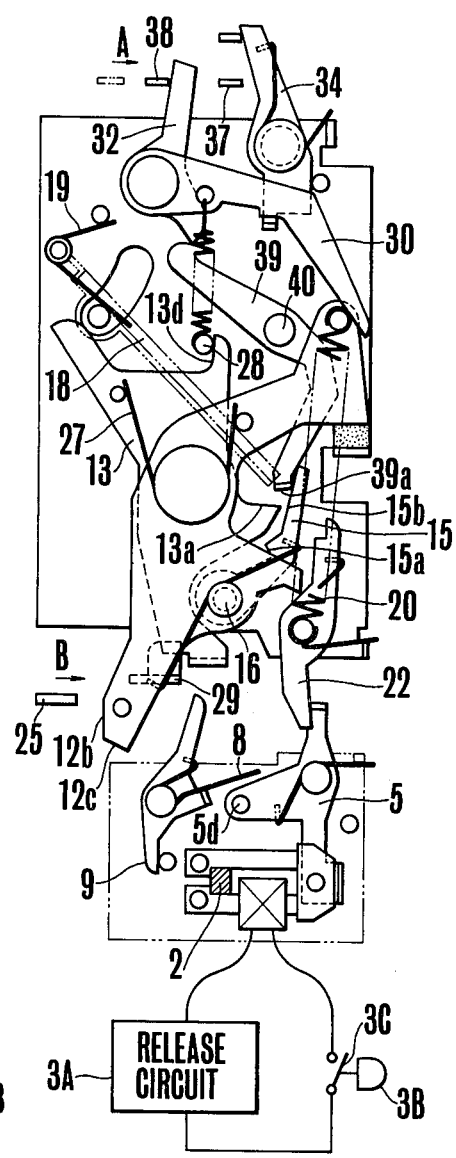
FIG. 4 is a plane view showing the device of FIG. 1 in the exposure completion state.

Then, after the completion of a predetermined exposure time, the device gets into the state shown in FIG. 4 from the state shown in FIG. 3.

With a signal of completion of running of the shutter rear screen (not shown), the rear screen signal member 38 moves from the position shown by the dotted line toward A in FIG. 4 to rotate the rear screen signal lever 32 in the clockwise direction and rotate the intermediate lever 39 around the pin 40 in the counterclockwise direction, and the portion 15b of the claw 15 is rotated by the projection 39a of the intermediate lever 39 around the pin 10 in the clockwise direction to release the engagement between the hooked portion 13a of the lever 13 and the hooked portion 15a so that the jumping lever 13 is rotated by the retracting spring 27 in the counter-clockwise direction, and then the lever 13 stops when its portion 13d contacts the stopper 28.

Simultaneously, the mirror receiving plate unit 18 is also rotated by the return spring 19 in the clockwise direction to be brought into contact with a mirror stopper (not shown) and stops at the initial state position. Together with this, the automatic diaphragm lever 29 is also returned by the return spring 19 to the initial state to open the diaphragm.

Description will be made on the subsequent winding-up operation for returning the device from the state of FIG. 4 to the state shown in FIG. 1.

When the charge connection lever 25 is moved through a winding-up system (not shown) toward B to charge the cam portion 12b in the counterclockwise direction against the driving spring 20, the hooked portion 22a of the start lever 22 engages with the energy storing lever 12 to return the device to the state shown in FIG. 1. At this time, the retraction spring charge lever 9 is rotated by in the clockwise direction by the pin 12c of the energy storing lever 12 so that the top end portion of the retraction spring 8 pushes the pin 5d of the armature holding lever 5 to give the force of the spring 8 to the armature holding lever 5. Under this condition, the attracting force generated by the permanent magnet 2 is still stronger so that the armature does not retract. In this way, the device gets into the state shown in FIG. 1 and space is provided between the portion 9a and the retraction spring 8 so that the retracting force is stored in the spring 8.

Simultaneously, the charge lever 37 charges the lever 34 through the winding-up system (not shown) to be engaged with the hooked claw 30, and then the members 25, 37 and 38 return to the state shown in FIG. 1.

According to the present invention, as described hereinabove, an attracting spring is coupled to the release operation initiating member 5 which holds the armature, and at once when the biasing force of the retraction spring is lost in the course of the shutter releasing action, the armature is reset on the core, so that there is no danger of erroneous operation caused by dust or damages thereby and additional members such as a dust-proof case are not required. Also according to the present invention, the release operation initiating member is accurately reset by the biasing force of the attracting spring, it is not necessary to greatly improve the manufacturing accuracy of the device.

In the forgoing embodiments of the present invention, the electromagnetic release device is provided for releasing the mirror lifting mechanism and the shutter, needless to say it is possible to provide an electromagnetic release device for releasing operation of an automatic diaphragm mechanism, etc.

What is claimed is:

1. An electromagnetic release device for use in a camera having a shutter, comprising:
   (a) a shutter release mechanism movable from a cocked position to a rest position for releasing the shutter;
   (b) holding means for releasably holding said shutter release mechanism at its cocked position;
   (c) a core including a permanent magnet for providing a magnetic attractive force;
   (d) release operation initiating means including an armature arranged to be retractably movable away from said core to disable said holding means to allow the movement of said shutter release mechanism to its rest position, said armature being attracted to said core by said magnetic attractive force;
   (e) a coil cooperable with said permanent magnet for cancelling said attractive force upon energization of the coil;
   (f) applying means for applying a biasing force to retractably move said armature of said release operation initiating means from said core, said applying means being arranged to disable the application of the biasing force and to cut off the engagement of the shutter release mechanism and the release operation initiating means after said release operation initiating means has disabled said holding means and before said shutter release mechanism reaches its rest position; and
   (g) biasing means coupled with said release operation initiating means and responsive to the disablement of said applying means for applying a biasing force to reset said armature on said core independently of said shutter release mechanism.

2. An electromagnetic release device according to claim 1, wherein said biasing means comprises a spring for urging said release operation initiating means so that said armature is reset on said core.

3. An electromagnetic release device according to claim 1, wherein said applying means includes first means arranged to disable the application of the biasing force after said release operation initiating means has disabled said holding means and before said shutter release mechanism reaches its rest position.

4. An electromagnetic release device for use in a camera having a shutter, comprising:
   (a) a shutter release mechanism movable from a cocked position to a rest position for releasing the shutter;
   (b) holding means for releasably holding said shutter release mechanism at its cocked position;
   (c) a core including a permanent magnet for providing a magnetic attractive force;
   (d) release operation initiating means including an armature arranged to be retractably movable away from said core to disable said holding means to allow the movement of said shutter release mechanism to its rest position, said armature being attracted to said core by said magnetic attractive force;
   (e) a coil cooperable with said permanent magnet for cancelling said attractive force upon energization of the coil;
   (f) means for energizing said coil;
   (g) applying means for applying a biasing force to retractably move said armature of said release operation initiating means from said core, said applying means being arranged to disable the application of the biasing force and to cut off the engagement of the shutter release mechanism and the release operation initiating means after said release operation initiating means has disabled said holding means and before said shutter release mechanism reaches its rest position; and (h) biasing means coupled with said release operation initiating means for applying a biasing force to reset said armature on said core in response to the disablement of the applying means.

5. An electromagnetic release device according to claim 4, wherein said biasing means comprises a spring for urging said release operation initiating means so that said armature is reset on said core.

6. An electromagnetic release device according to claim 4, wherein said applying means includes first means arranged to disable the application of the biasing force after said release operation initiating means has disabled said holding means and before said shutter release mechanism reaches its rest position.

7. An electromagnetic release device for use in a camera having a shutter, comprising:
(a) a shutter release mechanism movable from a cocked position to a rest position for releasing the shutter;
(b) holding means for releasably holding said shutter release mechanism at its cocked position;
(c) an electromagnet including a core, a permanent magnet for providing a magnetic attractive force, and a coil cooperable with said permanent magnet for cancelling said attractive force upon energization of the coil;
(d) release operation initiating means arranged to be retractably movable away from said core to disable said holding means to allow the movement of said shutter release mechanism to its rest position, said release operation initiating means having a portion attractable to said core by said magnetic attractive force;
(e) applying means for applying a biasing force to retractably move said release operation initiating means from said core and to disable the application of the biasing force after said release operation initiating means has disabled said holding means and before said shutter release mechanism reaches its rest position; and
(f) biasing means for applying a biasing force to reset said release operation initiating means and responsive to the disablement of said applying means independently of said shutter release mechanism.

8. An electromagnetic release device for use in a camera having a shutter, comprising:
(a) a shutter release mechanism movable from a cocked position to a rest position for releasing the shutter;
(b) holding means for releasably holding said shutter release mechanism at its cocked position;
(c) an electromagnet including a core and a coil;
(d) release operation initiating means arranged to be retractably movable away from said core to disable said holding means to allow the movement of said shutter release mechanism to its rest position;
(e) applying means for applying a biasing force to retractably move said release operation initiating means from said core and to disable the application of the biasing force after said release operation initiating means has disabled said holding means and before said shutter release mechanism reaches its rest position; and
(f) biasing means for applying a biasing force to reset said release operation initiating means independently of said shutter release mechanism.

* * * * *